(12) United States Patent
Towler

(10) Patent No.: US 7,894,533 B2
(45) Date of Patent: Feb. 22, 2011

(54) ANALYZING A TRANSPORT STREAM

(75) Inventor: Matthew Towler, Bar Hill Cambs (GB)

(73) Assignee: Tektronix, Inc., Beaverton, OR (US)

( * ) Notice: Subject to any disclaimer, the term of this patent is extended or adjusted under 35 U.S.C. 154(b) by 1172 days.

(21) Appl. No.: 10/658,992

(22) Filed: Sep. 10, 2003

(65) Prior Publication Data

US 2004/0047594 A1 Mar. 11, 2004

(30) Foreign Application Priority Data

| Sep. 11, 2002 | (GB) | ................... 0221071.4 |
| Sep. 11, 2002 | (GB) | ................... 0221072.2 |
| Sep. 11, 2002 | (GB) | ................... 0221073.0 |
| Sep. 11, 2002 | (GB) | ................... 0221074.8 |

(51) Int. Cl.
 *H04N 7/12* (2006.01)
 *H04N 11/02* (2006.01)
 *H04N 11/04* (2006.01)
(52) U.S. Cl. ..................... 375/240.25; 375/240.26; 375/240.27
(58) Field of Classification Search ............ 375/240.25–240.27; 386/46
 See application file for complete search history.

(56) References Cited

U.S. PATENT DOCUMENTS

| 5,583,863 | A * | 12/1996 | Darr et al. .................... 370/397 |
| 6,137,549 | A   | 10/2000 | Rasson et al. |
| 6,445,679 | B1 * | 9/2002 | Taniguchi et al. ........... 370/232 |
| 6,473,129 | B1 * | 10/2002 | Choi ......................... 348/465 |
| 6,505,347 | B1 * | 1/2003 | Kaneko et al. ................ 725/39 |
| 6,609,144 | B1 * | 8/2003 | Inoue et al. ................. 718/100 |
| 6,678,332 | B1 * | 1/2004 | Gardere et al. ......... 375/240.26 |

| 2002/0022462 | A1 | 2/2002 | Schill et al. |
| 2002/0049730 | A1 | 4/2002 | Ishikawa et al. |
| 2002/0161822 | A1 | 10/2002 | Hamada et al. |

FOREIGN PATENT DOCUMENTS

| CA | 2323647      | 4/2001 |
| EP | 1085750 A2   | 3/2001 |
| WO | WO 97/46009 A1 | 12/1997 |
| WO | WO 99/03266 A1 | 1/1999 |
| WO | WO 01/05157 A2 | 1/2001 |
| WO | WO 01/75888 A1 | 10/2001 |

OTHER PUBLICATIONS

Jerry Whitaker, "PSIP is Key to DTV Implementation" May 15, 2001, www.digitaltelevision.com.

* cited by examiner

*Primary Examiner*—Marsha D Banks Harold
*Assistant Examiner*—Chikaodili E Anyikire
(74) *Attorney, Agent, or Firm*—Francis I. Gray

(57) ABSTRACT

A transport stream of a compressed video signal is monitored. Information elements extracted from the transport stream prompt the generation of messages which are assigned a predetermined priority dependent upon their pre-determined criticality to integrity of the video signal. The generated messages are queued for analysis by analyzer modules only if their priority exceeds a current value of a variable threshold priority level for the queue. The variable threshold priority level is varied dependent on the current length of the queue. When the threshold level is raised, messages already in the queue having a lower priority than the new threshold priority are discarded from the queue without analysis. Thus a varying proportion of the least important messages are progressively discarded so that the apparatus continuously stabilizes at a maximum proportion of messages that the monitor can handle without overload, while always analyzing messages corresponding to the most critical parameters of the transport stream.

17 Claims, 9 Drawing Sheets

TABLE ID=42
PID=11

| SERVICE DESCRIPTION TABLE 501—TRANSPORT ID 3 | | ~500 |
|---|---|---|
| PROGRAM NUMBER | PROGRAM IDENTIFIERS | |
| 1001 | BBC1 | |
| 1002 | 502 BBC2 | |
| 1200 | NEWS 24 | |

| SERVICE DESCRIPTION TABLE TRANSPORT ID 4 | | ~511 |
|---|---|---|
| PROGRAM NUMBER | PROGRAM IDENTIFIERS | |
| 1001 | ITV1 | |
| 1020 | ITV2 | |

| SERVICE DESCRIPTION TABLE TRANSPORT ID 5 | | ~512 |
|---|---|---|
| PROGRAM NUMBER | PROGRAM IDENTIFIERS | |
| 1200 | SKYSPORT1 | |
| 1201 | SKYSPORT2 | |

FIG.9

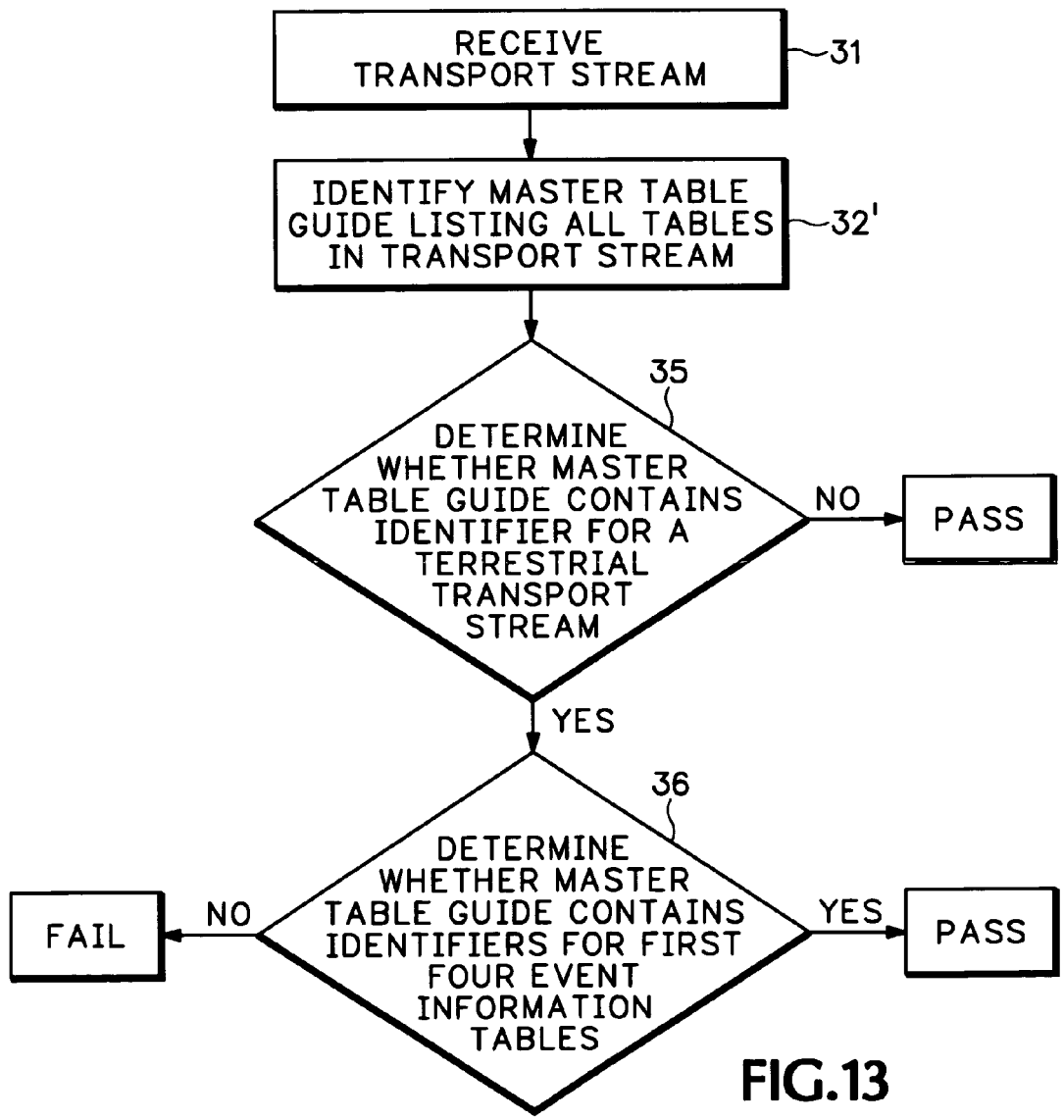

ANALYZING A TRANSPORT STREAM

BACKGROUND OF THE INVENTION

This invention relates to analysis of compressed video signals, and more particularly to a method and apparatus for analyzing a transport stream for a compressed video signal.

In known monitors for real-time monitoring and analysis of compressed video signals, such as MPEG-2 compressed video signals, transport stream packets of the video signal are received by the monitor and analyzed sequentially in the order in which they are received. However, such stream analysis requires greater computational power than merely receiving the video signal in a set top box or other MPEG stream receiver. This is not only because the analyzer must analyze all the services in the stream, whereas the receiver receives only a single service, but because in addition some items in the stream take considerably more power to analyze than they do to use. For example, Program Clock Reference (PCR) values are analyzed by applying a best-fit line algorithm to the data whereas in a receiver the values are fed directly into a phase locked loop without analysis. As a result of the computational requirements of analysis, and the practical limits on computational power that may realistically and cost-efficiently be provided, the transport stream of a compressed video signal may contain more information than can be analyzed in real time. As a result the monitor may become overloaded, causing the monitor to perhaps crash, reset or randomly drop packets.

An MPEG-2 transport stream typically carries multiple programs or services. Such transport streams may carry up to 150 programs. The transport stream has program elements in packets, each packet being identified by a Packet Identifier (PID). Program Association Tables (PATs) are included as packets in the transport stream. The PATs list for each program PIDs that identify Program Map Tables (PMTs) which describe the program and provide PIDs for constituents of a given program. Each of the programs transmitted in the transport stream is assigned a Program Number in the PAT and the respective Program Numbers also appear in each PMT. These tables are repeated approximately every two second in the transport stream so that a PAT is received within approximately two seconds after switching on a receiver to initiate service to the receiver. European Telecommunications Standards Institute (ETSI) standard TR 101 290, available from ETSI, 650 Route des Lucioles, F-06921 Sophia Sntipolis Cedex, France, stipulates that a PMT should appear in the transport stream within every half second for each PMT packet identifier. However even though a transport stream may pass this basic test, this does not test whether all of the PMTs for each program having PIDs assigned by the PATs are present in the transport stream.

Also included in the transport stream there are repeated instances of a Service Description Table (SDT) describing each of the services or programs being transmitted by that transport stream. Included for example are a program name for each service, which may be displayed at a receiver when a user receives a service. This is referred to as the actual SDT. For example where the service is a broadcast television channel, the name of the channel may be displayed on a television receiver. There may also be included in the transport stream other SDTs giving details of services being transmitted in other transport streams, such as at other radio frequencies, that are also receivable by the receiver. This provides the user the ability to transparently receive details of all receivable services without needing to be aware that they are transmitted in different transport streams, or in which transport streams they are transmitted. ETR 211 "Digital Video Broadcasting (DVB); DVB Guidelines for Implementation and Usage of Service Information (SI)", also available from ETSI, makes the inclusion of an actual SDT mandatory and requires that the SDT of an actual transport stream shall list at least all the services or programs of that transport stream. In addition any SDT for another transport stream than the actual transport stream in which the SDT is transmitted shall list all the services or programs of that other transport stream. Each of the programs transmitted in the transport stream is assigned a Program Number in the PAT, as indicated above, and the respective Program Numbers also appear in the SDT, the Program Number or Service Identity (SID) being unique within each transport stream. These tables are repeated approximately every two seconds, like the PMTs, so that an SDT is received also within approximately two seconds of a user seeking details of programs being transmitted in the transport stream. ESTI standard TR 101 290, referenced above, stipulates that an actual SDT should appear in the transport stream every two seconds. However even though a transport stream may pass this basic test, this does not test whether SDTs contain details of all the services being transmitted in the transport stream as required by the standard. This may result in a failure to name a program being received by failing to display the program identifier.

Further included as packets in the transport stream may be Master Guide Tables (MGTs) that list PIDs for all other tables which should be present in the transport stream apart from a System Time Table. ATSC Standard A/65 "Program and System Information Protocol for Terrestrial Broadcast and Cable" requires the presence in transport streams for terrestrial transmission of an MGT and also four Event Information Tables EIT-0, EIT-1, EIT-2 and EIT-3. Terrestrial transport streams are recognizable by the presence of a Terrestrial Virtual Channel Table (TVCT) type entry. The Event Information Guides list the programs to be transmitted in each of three-hour sessions, EIT-0 being the current session, EIT-1 being the next three-hour session, etc. Other EITs for later periods of time, for example up to a weeks programming, may optionally also be included. There is no requirement in the standard for EITs in satellite or cable transport streams. It is not necessarily known a priori when testing a transport stream whether it is a terrestrial transport stream. Even if it is known, there are no guidelines in the standard on how to monitor whether a terrestrial transport stream meets the standard in respect to the presence of EITs.

What is desired is a method of preventing a compressed video signal monitor from becoming overloaded while analyzing and verifying complete conformance with appropriate standards.

BRIEF SUMMARY OF THE INVENTION

According the present invention provides an apparatus and method of monitoring and analyzing a transport stream of a compressed signal that includes receiving the transport stream, extracting an information element from the transport stream, generating a message of a predetermined type dependent on the extracted information element, assigning a priority to the message which is dependent on a predetermined criticality of the type of the message to the integrity of the video signal, determining whether the priority of the message exceeds a current value of a variable threshold priority level and, if so, adding the message to a message queue and, if not so, discarding the message from analysis, determining whether a size of the queue is within a predetermined range and, if not, adjusting the current value of the variable threshold priority level in dependence thereon and discarding from analysis any messages in the queue having a priority less than the adjusted threshold priority level, selecting a next message from the queue, and analyzing the next message with an analyzer module from a plurality of analyzer modules adapted for the particular type of message of the next message.

Preferably, determining whether a size of the queue is within a predetermined range includes determining whether a size of the queue exceeds a predetermined maximum size and, if so, increasing the current value of the variable threshold priority level to a higher value and discarding from analysis any messages in the queue having a priority less than the higher value, and if not so, determining whether the size of the queue is less than a predetermined minimum size and, if so, reducing the current value of the variable threshold priority level to a lower value. Advantageously, reducing the current value of the threshold priority level includes determining an elapsed time since the value of the variable threshold priority level was last changed and reducing the value of the threshold priority level only if the elapsed time exceeds a predetermined hysteresis time. Preferably, selecting the next message from the queue includes registering which of the analyzer modules are to analyze which types of messages and determining the type of the next message, and dispatching the next message to those of the analyzer modules that have a registered interest in the determined type of message. Conveniently, adjusting the current value of the variable threshold priority level, thereby changing a determination whether messages of particular types may enter the queue, includes informing each of the analyzer modules that have a registered interest in those particular types of message of the change. Further, analyzing the next message includes outputting results of the analysis to a user interface means. Advantageously, analyzing the next message includes logging results of the analysis.

The analyzer modules include modules for analyzing selected information elements, such as PMTs, SDTs, MGTs, etc. The analyzer modules identify in the transport stream the selected information element and analyze the selected information element to assure complete compliance with the associated standard, such as the MPEG-2 standard. Part of the analysis is the detection of a change in the selected information element so that the analysis may be suspended until such change is reflected in related information elements.

The objects, advantages and other novel features of the present invention are apparent from the following detailed description when read in conjunction with the appended claims and associated drawing.

BRIEF DESCRIPTION OF THE SEVERAL
VIEWS OF THE DRAWINGS

FIG. 9 is an illustration of SDTs from a transport stream.

FIG. 12 is an illustration of a MGT from a transport stream.

FIG. 13 is a flowchart of steps for analyzing MGTs according to the present invention.

DETAILED DESCRIPTION OF THE INVENTION

Figure 1:
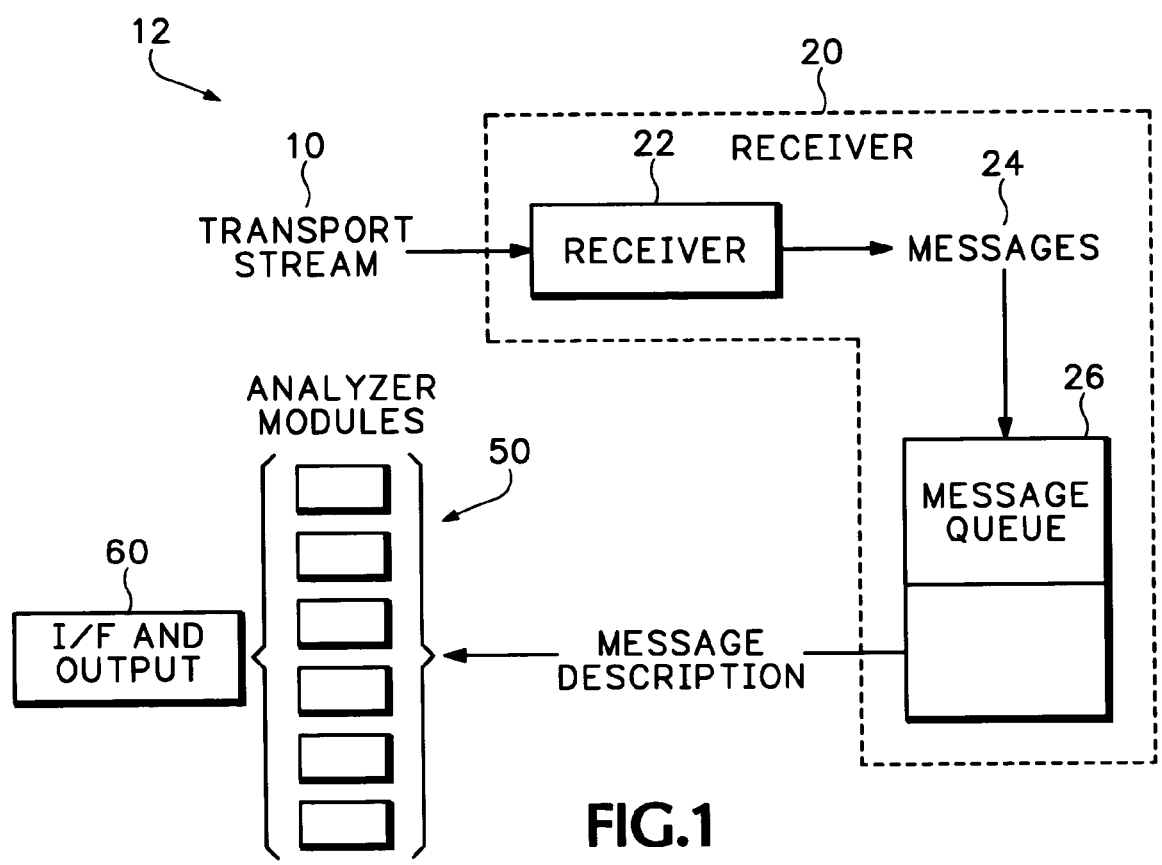
FIG. 1 is a conceptual information diagram of a monitor according to the present invention.

Referring now to the conceptual flow diagram of FIG. 1, a transport stream 10 of a compressed video signal is input to a monitor 12 where it is subjected to a low level information extractor 22 in a receiver 20 to extract information elements from the transport stream for analysis. Based on the information elements extracted, a message 24 is generated. The message is an entity containing an arbitrary item or items of the information elements from the transport stream or a description of that information element. For example, where the information element is an erroneous continuity count, the message may be that the continuity count forms an illegal pattern. This selection of messages from the transport stream is treated as the highest priority task of a computer processing unit (not shown) of the analyzer or monitor 12.

Thus all possible message types are predefined in the construction of a monitor 12 for a particular application. Each type of message is pre-assigned a priority dependent on the criticality of the type to the integrity of the transport stream being analyzed. The types of message most critical to the integrity of the video signal are assigned the highest priority and the least critical messages the lowest priority. More than one type of message may have the same priority level. The priorities for each type of message may be pre-set and unchangeable in use. Preferably the priorities are set in accordance with ETSI standard TR 101 290, referenced above. This standard sets priorities of parameters recommended for evaluation, First Priority parameters being necessary for decodability, Second Priority parameters being recommended for continuous or periodic monitoring and Third Priority parameters being for application dependent monitoring. For example, all messages corresponding to Second Priority parameters in the standard are given the same priority level as each other in the monitor 12, which priority level is lower than priority levels assigned to First Priority parameters and higher than priority levels assigned to Third Priority parameters.

Figure 2:
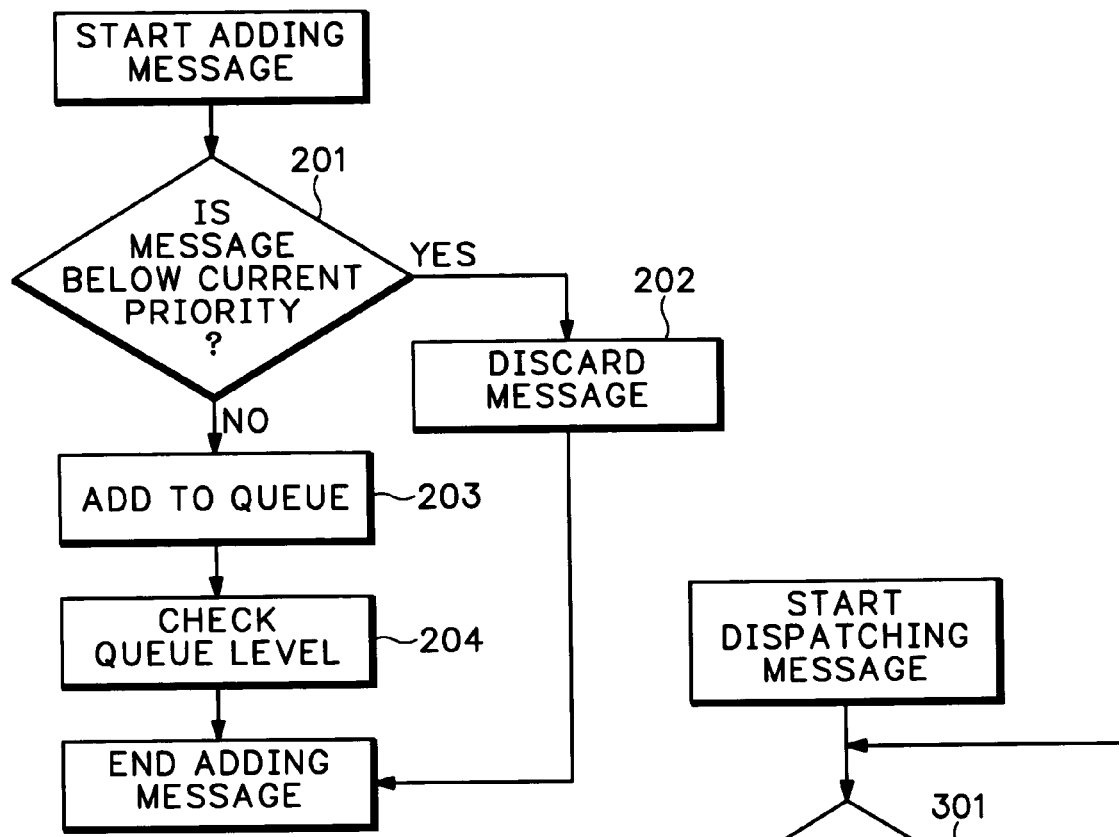
FIG. 2 is a flowchart of steps for adding a message to a queue used in the invention of FIG. 1 according to the present invention.
Figure 3:
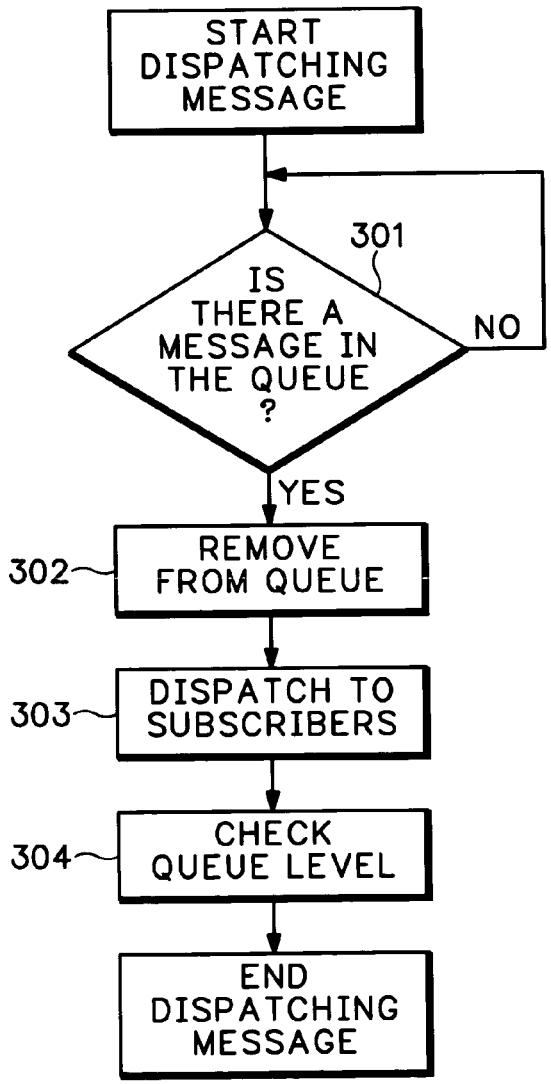
FIG. 3 is a flowchart of steps for removing a message from the queue of FIG. 2 according to the present invention.

Before being analyzed by separate analyzer modules 50 for each type of message respectively, the messages are held in a message queue 26. However, as illustrated in FIG. 2, messages are added to the message queue only if their priority exceeds a present value of a variable or adaptive threshold priority level for the message queue. Therefore, for each message it is determined, step 201, whether the message has a lower priority than the current value of the threshold priority level. If the message has a lower priority, the message is discarded, step 202, and not analyzed. If the message has a priority equal to or greater than the threshold priority level, the message is added, step 203, to the message queue 26. After adding the message to the queue, the number of messages in the queue, i.e. the message queue level, is checked, step 204, to determine whether the threshold priority level should be changed.

Messages with a priority higher than the threshold priority level are ordered in the message queue 26 in the order in which they are received from the transport stream, so that they may be extracted from the queue and processed by the analyzer modules 50 in the order in which the information originally appeared in the transport stream 10.

The analyzer modules 50 may have their interest in particular types of messages registered with a queue dispatcher and receive messages and message state notifications corresponding to the types of messages in which they are interested using an Observer pattern described in *Design Patterns* by Gamma, Helm, Johnson and Vlissides, published by Addison-Wesley in 1995. When analysis of a previous message is complete, the queue dispatcher retrieves, steps 301 and 302, the next, i.e., chronologically oldest, message from the queue 26, determines the type of the next message and dispatches, step 303, the retrieved next message to all those analyzer modules 50 having a registered interest in that type of message.

The results from the individual analyzer modules 50 for each type of message are displayed respectively on a user interface and analysis output 60 and may also be logged for subsequent review by a user. This analysis process runs at a lower computational priority than the initial selection of information elements from the transport stream, and uses the remainder of the available computational resources not being used by that highest priority extraction.

Figure 4:
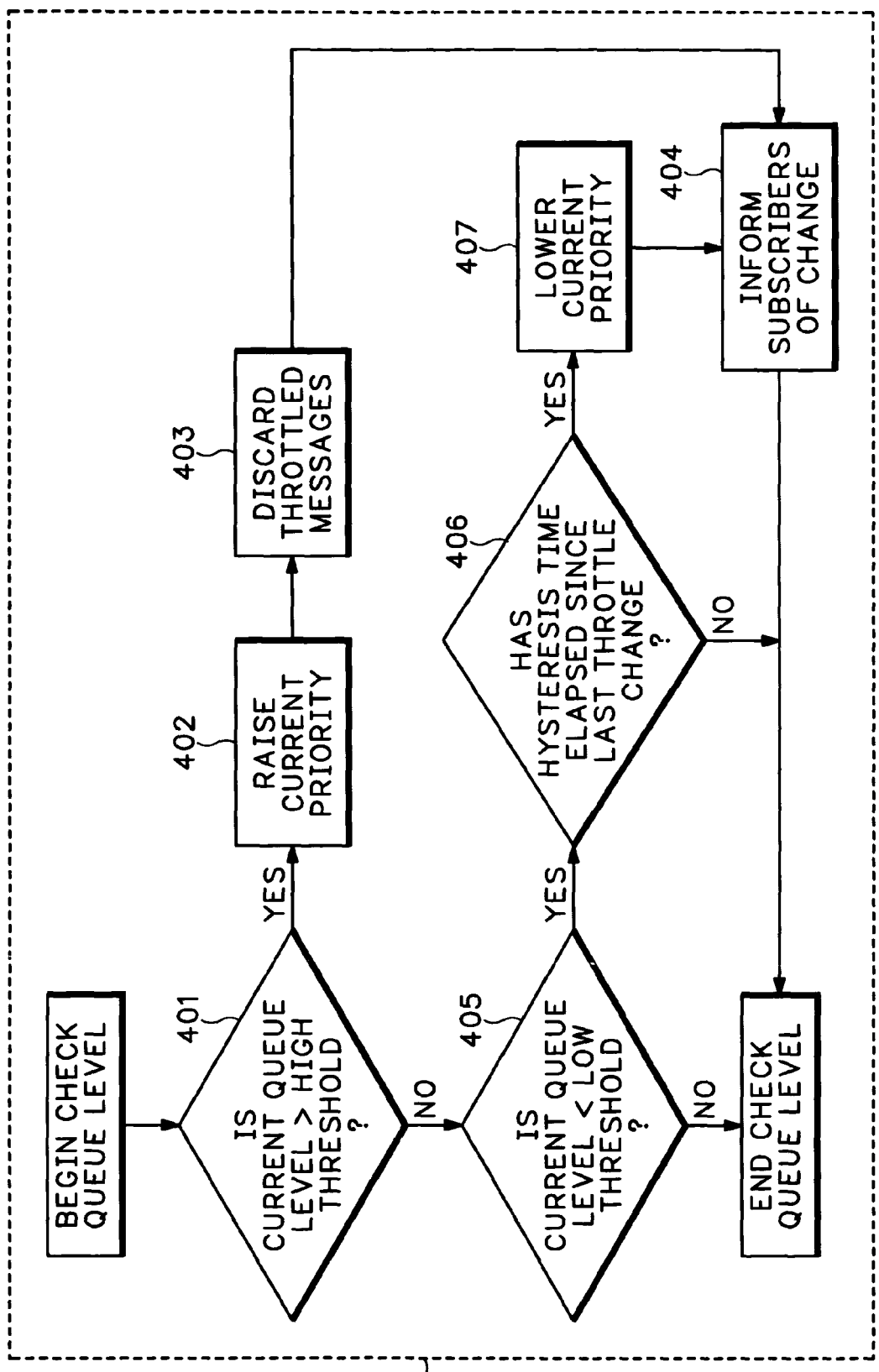
FIG. 4 is a flowchart of steps for changing a threshold priority level for the queue of FIG. 2 according to the present invention.

After removal of a message from the queue, the queue level is again checked, step 204, to determine whether the value of the variable threshold priority level should be changed. As illustrated in FIG. 4, to determine, step 204, whether the value of the variable threshold priority level should be changed, the queue level is checked to determine, step 401, whether the queue level exceeds a predetermined maximum level, i.e., a maximum number of messages. If so, the current value of the threshold priority level is raised, step 402, to a raised value and any messages in the queue having a priority level less than the raised value are removed from the queue and discarded, step 403. However, in order always to analyze messages which have been assigned the highest priority, the threshold priority level cannot be raised above the highest priority. Therefore where, for example, the analyzer module 50 is accumulating data from a number of successive messages and is informed that such messages are no longer being queued for analysis, the analyzer module may discard data already accumulated and reset to await messages of that type again being accepted for analysis. A time when the threshold priority level is changed is recorded, or a clock is started when the threshold priority level is changed. A user of the monitor 12 may also be informed of the new threshold priority level, for example by means of the user interface 60 on which outputs from the analyzer modules 50 are displayed, so that the user is aware at what priority level parameters are presently being monitored.

If the queue level does not exceed the predetermined maximum, it is determined, step 405, whether the queue level is less than a predetermined minimum level. If so, it is also determined, step 406, whether a predetermined hysteresis time has elapsed since the threshold priority level was last changed, either by comparing the present time with the recorded time of the last change or by interrogating the clock started when the last change was made. If the time elapsed since the last change exceeds the predetermined hysteresis time, the current value of the threshold priority level is lowered, step 407, to a lower value. This avoids the possibility of oscillations of values of the variable threshold priority level which could occur if the value were lowered as soon as messages are discarded from the queue.

When the value of the variable threshold priority level is changed, so as to affect decisions whether messages of particular priority levels are accepted into the queue, corresponding analyzer modules 50 which have a registered interest for that type of message, are informed, step 404. A user of the monitor 12 may be informed of the changed value of the threshold priority level via the user interface 60.

If the current queue level is not less than the predetermined minimum level, or the time since the last change to the threshold priority level is not greater than the predetermined hysteresis time, no change is made to the current value of the threshold priority level.

Thus the invention has the advantage that, by prioritizing all the messages in the transport stream of the compressed MPEG-2 signal, the monitor 12 selectively and progressively discards a varying proportion of the least important messages so that the monitor continuously stabilizes at a maximum proportion that the monitor can handle without overload, while always analyzing the most important parameters of the transport stream. The information of interest is a subset of all the information carried in the transport stream of a MPEG2 signal, for instance, as defined in the MPEG-2 Systems Specification ISO/IEC 13818-1, for example the information conveyed in a 4 byte transport packet header. The user may monitor the proportion of the information being analyzed at any time by, for example, being informed of a current value of the threshold priority level.

In summary, a transport stream 10 of a compressed signal, particularly a video signal, is monitored. Information extracted from the transport stream is used to prompt the generation of messages 24 which are assigned a predetermined priority dependent upon their predetermined criticality to integrity of the video signal. The messages 24 are queued for analysis by analyzer modules 50 only if their priority exceeds a current value of a variable threshold priority level for the queue 26. The variable threshold priority level is varied, up to the highest priority assigned to messages, dependent on the current length of the queue. When the threshold level is raised, messages already in the queue having a lower priority than the new threshold priority are discarded from the queue without analysis. Thus a varying proportion of the least important messages are progressively discarded, so that the monitor 12 continuously stabilizes at a maximum proportion of messages that the monitor can handle without overload, while always analyzing messages corresponding to the most critical parameters of the transport stream 10.

Figure 5:
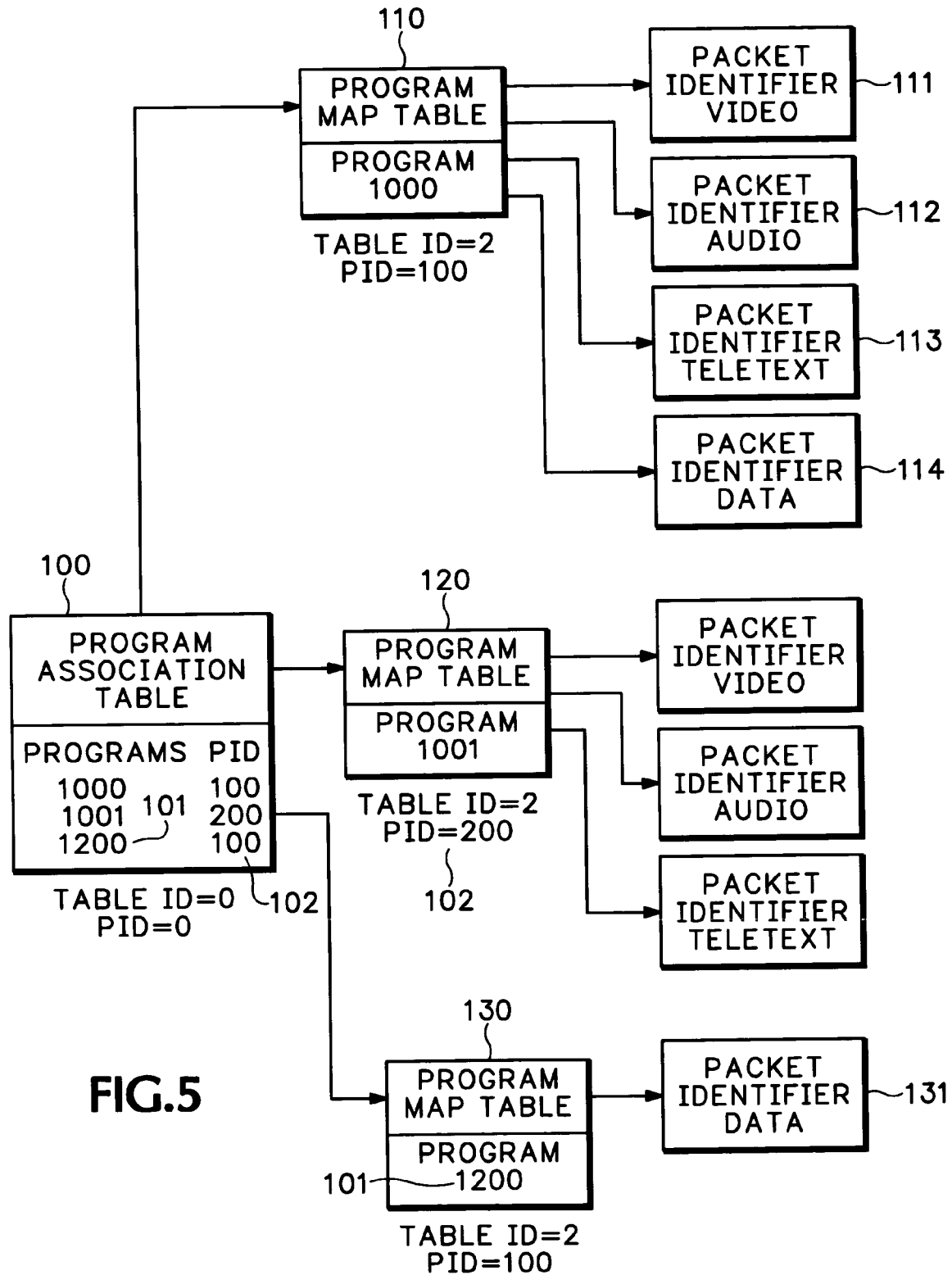
FIG. 5 is an illustration of the relationship of PATs to PMTs and associated program elements.

Referring now to FIG. 5 a PAT to PMTs of a transport stream suitable for analysis by one of the analyzing modules 50 is shown. The PAT 100 is included in packets with a PID value of zero and a Table Identifier of zero, and points to the PIDs of first, second and third PMTs 110, 120, 130 identified by Table Identifier=2 for Programs 1000, 1001 and 1200 respectively. The first, second and third PMTs have PIDs=100, 200 and 100 respectively. More than one program may have PMTs with the same PID. The first PMT 110 maps to packet identifiers of the video stream 111, audio stream 112, teletext stream 113 and data stream 114 of Program 1000. On the other hand the third PMT 130 maps only to a data stream 131 for sharing between a number of programs, such as Program 1001, which do not have a dedicated data stream.

Figure 6:
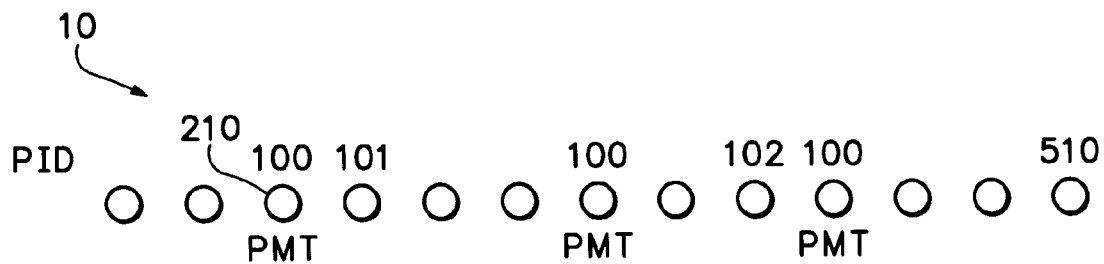
FIG. 6 is an illustration of the distribution of PMTs in a transport stream.

Packets with PID=100 may contain PMT sections, where a section is a portion of a table. Not all packets with PID=100 contain table sections, but only those having such an indication within a packet header of the packet. As shown in FIG. 6, since the PMT 210 with PID 100 is dispersed and repeated throughout the transport stream 10 within a given time period, such as every half-second, a packet containing a PMT section should be received, and this is all the prior art tested.

As illustrated in FIG. 5 each of the programs in the transport stream is allocated a Program Number 101 in the PAT 100. Because a PMT of more than one program may have the same PID, each of the PMTs also contains an associated one of the Program Numbers 101 so that the receiver 20 identifies to which program the received PMT refers.

Figure 7:
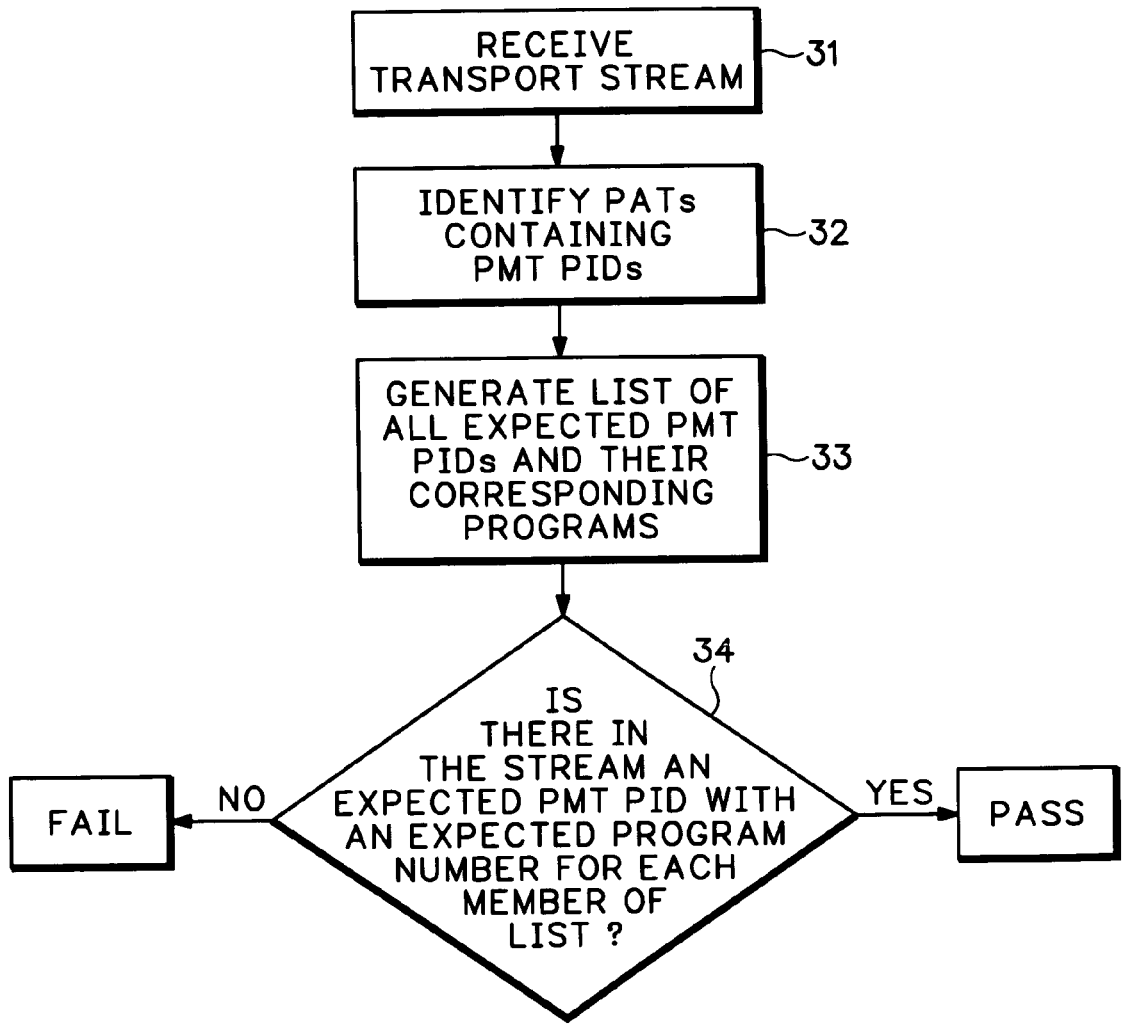
FIG. 7 is a flowchart of steps for analyzing PMTs according to the present invention.
Figure 8:
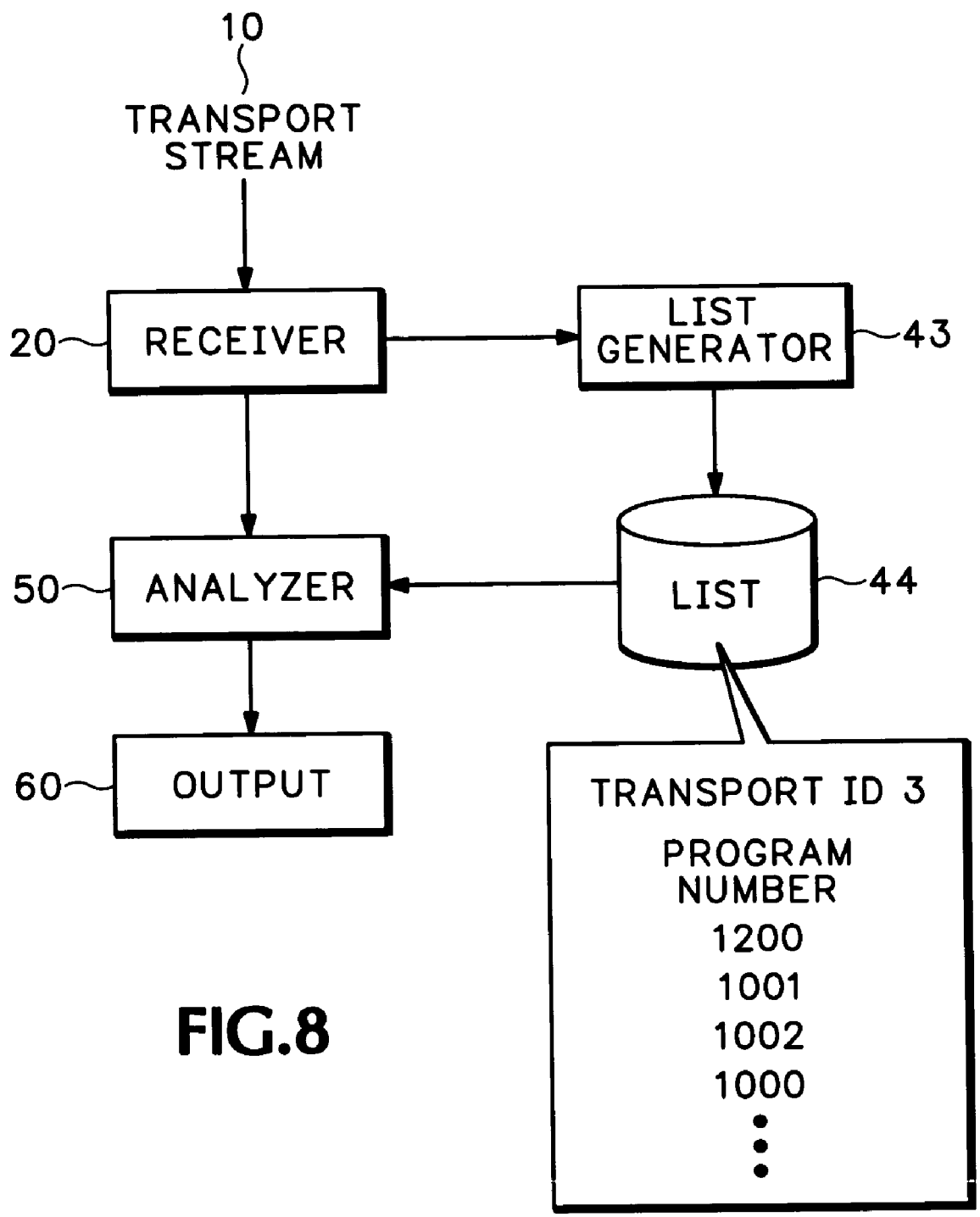
FIG. 8 is a conceptual block diagram view processing an information element according to the present invention.

Therefore, although the prior art checked that PMTs are regularly received, it was not ascertained that they were the correct tables or that all the required tables were present in the stream. As shown in FIG. 7 the transport stream 10 is received, step 31, by the receiver 20 and the PATs are identified, step 32, for example by their inclusion in the transport streams in packets with a PID equal to zero and their Table Identifiers being equal to zero. A list of Program Numbers and corresponding PIDs of their PMTs are extracted, step 33, from the PATs by a list generator 43, shown in FIG. 8, to form a list 44 of PIDs 102 and the Program Numbers 101 of PMTs 110, 120, 130 associated with the PIDs. Packets with the listed PIDs in the transport stream are analyzed against the listed PIDs by the appropriate analyzer module 50 to ascertain whether a packet exists in the transport stream containing a PMT corresponding to each of the PID and Program Number pairs on the list, step 34. If a pair is found missing, an alert or other warning is provided on the user interface 60. Reparation action may then be initiated, typically to multiplexers generating the PATs and PMTs.

A special situation arises where programs are added, removed or adjusted within the transport stream 10. Such changes must be reflected in a version change in the PATs 100 and PMTs 110, 120, 130, but the changes cannot be made simultaneously in both types of tables. Partly because the order of packets may change during transmission, it cannot be predicted whether an updated PAT or an updated PMT will be received first by the receiver 20. Therefore a false error may be detected because an updated PAT may be incompatible with a PMT which has not yet been updated, and vice versa. The versions of the tables are reflected in version numbers carried within the tables which are updated for each version change. The analyzer module 50, when a version change is detected in a table, suspends the analysis for a predetermined period of stream time both before and after the version change. The analysis is conveniently suspended for a user-adjustable period of one second of the transport stream both before and after the version change.

Figure 10:
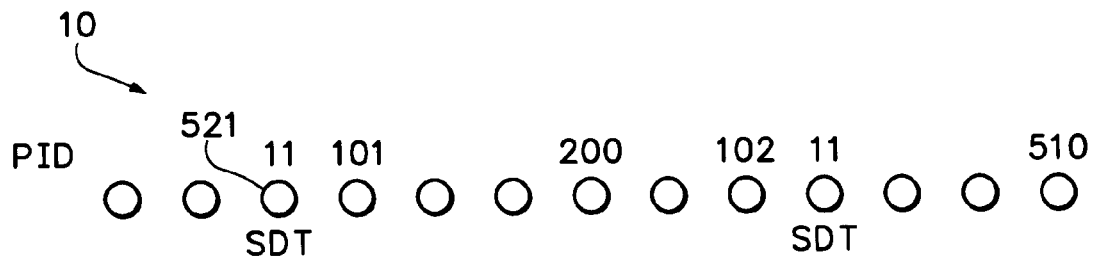
FIG. 10 is an illustration of the distribution of SDTs in a transport stream.
Figure 11:
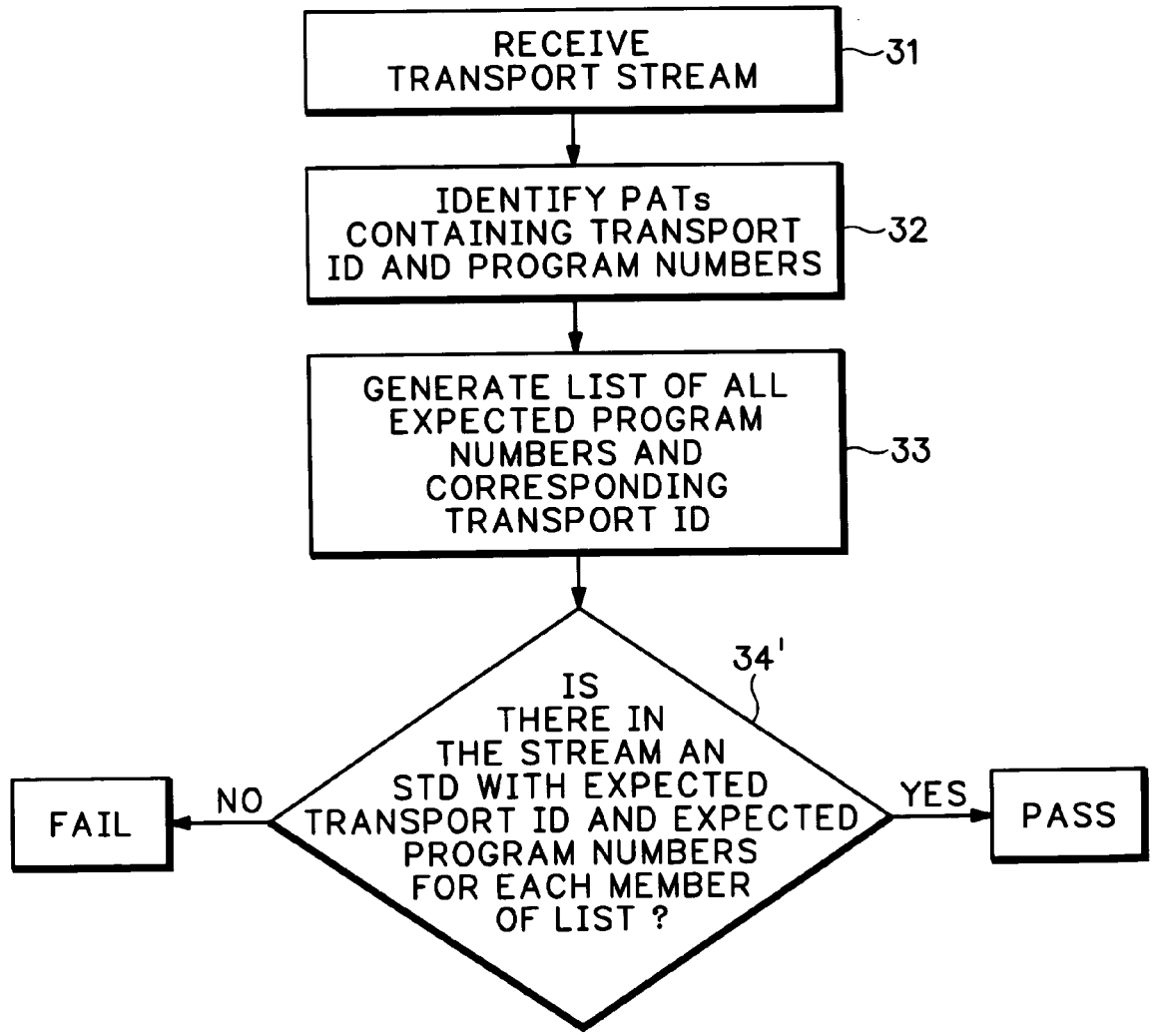
FIG. 11 is a flowchart of steps for analyzing SDTs according to the present invention.

Referring now to FIGS. 9-11 the transport stream 10 contains an actual SDT 500, identified as such by Table Identifier=42 containing a transport stream identifier 501 and details of services or programs carried by the transport stream including program identifiers 502 for each Program Number. There may also be other SDTs 511, 512 in the transport stream relating to programs in other transport streams. Because Program Numbers are only unique to a transport stream, there may be identical Program Numbers with different program identifiers in different SDTs. As illustrated in FIG. 10, since the actual SDTs 521 with Table Identifier=42 are dispersed and repeated throughout the transport stream, within a given time period, such as every two seconds, a packet containing an SDT section should be received, which is all that is tested in the prior art. Therefore, although the prior art checked that SDTs were regularly received, it was not ascertained that they were the correct tables or that all the required program identifiers were present. If incorrect tables are received, or some tables are not received at all, the receiver 20 is not able to display, either temporarily or permanently, one or more program identifiers.

As shown in FIG. 11 additional steps are carried out in the analyzer module 50 to determine that all required program identifiers are present in the transport stream. The transport stream 10 is received, step 31, by the receiver 20 and the PATs are identified, step 32, by their inclusion in the transports stream in packets with a PID of zero and Table Identifiers being equal to zero, as discussed above. The Transport Identifier and Program Numbers are extracted, step 33, from the PATs by the list generator to form the list of Program Numbers for the Transport Identifier. SDTs in the transport stream are analyzed, step 34', against the Program Numbers list by the analyzer module 50 to ascertain whether for each of the Program Numbers in the list there is a corresponding Program Number and Program Identifier entry in the SDTs for the subject Transport Identifier. By listing with their corresponding Transport Identifiers the Program Numbers for all receivable transport streams, it is apparent that completeness of both the actual and other SDTs may be analyzed. If the Program Descriptor is found to be missing, an alert or other warning is provided on the user interface 60, and reparative action may then be initiated.

A special situation arises where programs are added, removed or adjusted within the transport stream, as discussed above. Such changes must be reflected in a version change in the PATs and SDTs, but the changes cannot be made simultaneously in both types of tables. This is particularly so because the SDT may be large and take a considerable time to be received or to be updated. Partly because the order of packets may change during transmission, it cannot be predicted whether an updated PAT or an updated SDT will be received first by the receiver 20. Therefore a false error may be detected because an updated PAT may be incompatible with an SDT which has not been update, and vice versa.

As indicated above, the versions of the tables are reflected in version numbers carried within the tables, which are updated for each version change. In the analyzer module 50 when a version change is detected in a table, the analysis is suspended and not applied to the transport stream for a predetermined period of time both before and after the version change. The analysis is conveniently suspended for a user-adjustable period of one second of the transport stream both before and after the version change.

According to ATSC Standard A/65 there also may be Program and System Information Protocol (PSIP) tables in the transport stream complying with the standard which describe all the digital channels multiplexed in the transport stream. The tables may optionally include information about analog channels as well as other digital channels available in different transport streams. In this case the consistency analysis by the analyzer module 50 is passed if, for all programs listed in the PAT, there is an entry in a Virtual Channel Table (VCT) whose program number matches that in the PAT and whose channel transport stream identifier matches the PAT. In other words the analysis checks that the VCT does contain a description for all the programs in the multiplexed transport stream.

Finally referring to FIG. 12 the transport stream 10 contains a MGT 610 identified as such by PID=1 FFB, the MGT containing a table type 601 for a terrestrial transport stream and a list of EITs including the EIT type 602 and the corresponding PID 603 in the transport stream. As shown in FIG. 13 in the analyzer module 50 steps are carried out to determine that all required EITs are present in the transport stream. The transport stream is received, step 31, by the receiver 20 and the MGT is identified, step 32', by a PID being equal to hexadecimal 1FFB and containing a section with a Table Identifier 0xc7. The instance of the MGT from the transport stream is analyzed, step 35, to determine whether an indicator is present indicating that the transport stream is a terrestrial transport stream. If no indicator is found, the analysis ends because the requirement for EITs applies only to terrestrial transport streams. If the transport stream is determined to be a terrestrial transport stream, the MGT is further analyzed, step 36, for the presence of at least the first four EITs for the current time slot and the next three three-hour time slots respectively. If the first four EITs are not present, an alert or other warning is provided on the user interface 60, and reparative action may then be initiated.

Thus the present invention provides an apparatus and method of analyzing a transport stream for a compressed video signal by extracting information elements from the transport stream in the form of messages having a predetermined type and associated priority, storing the messages in a message queue according to their priority relative to an adaptive priority threshold, and analyzing the messages using an appropriate analyzer module to provide a complete conformance analysis against the applicable standard.

What is claimed is:

1. A method of monitoring a transport stream of a compressed video signal comprising the steps of:
   extracting an information element from the transport stream;
   generating a message of a predetermined type dependent on the extracted information element;
   assigning a priority to the message, the priority being dependent on a predetermined criticality of the predetermined type to the integrity of the compressed video signal;
   adding the message to a message queue if the priority of the message exceeds a variable threshold priority level;
   adjusting the variable threshold priority level in dependence upon whether a size of the message queue is within a predetermined range to obtain an adjusted variable threshold priority level, discarding messages in the message queue having a priority less than the adjusted variable threshold priority level; analyzing a next message from the message queue according to the predetermined type of the next message;
   wherein the adjusting step comprises the steps of: increasing the variable threshold priority level to a higher level as the adjusted variable threshold priority level if a size of the message queue exceeds a predetermined maximum size;
   discarding the messages in the message queue having a priority less than the adjusted variable threshold priority level;
   otherwise reducing the variable threshold priority level to a lower level as the adjusted variable threshold priority level if the size of the message queue is less than a predetermined minimum size;
   whereing the reducing step comprises the steps of: determining an elapsed time since the level of the variable threshold priority level was last changed; and
   reducing the level of the variable threshold priority level as the adjusted variable threshold priority level if the elapsed time exceeds a predetermined hysteresis time.

2. The method as recited in claim 1 wherein the analyzing step comprises the steps of:
   registering as to which predetermined types of messages each analyzer module of a plurality of analyzer modules processes;
   determining the predetermined type of the next message; and
   dispatching the next message to at least one of the analyzer modules which is registered to process the predetermined type of the next message.

3. The method as recited in claim 2 wherein the adjusting step comprises the step of informing each of the analyzer modules which is registered to process the predetermined types of messages when there is a change.

4. The method as recited in claim 1 further comprising the step of outputting results of the analyzing step to a user interface.

5. The method as recited in claim 1 further comprising the step of logging results of the analyzing step.

6. An apparatus for monitoring a transport stream of a compressed video signal comprising:
   means for extracting an information element from the transport stream;
   means for generating a message of a predetermined type dependent upon the information element extracted;
   means for assigning a priority to the message dependent on a predetermined criticality of the predetermined type of message to the integrity of the compressed video signal;
   means for adding the message to a message queue if the priority of the message exceeds a variable threshold priority level, and otherwise discarding the message;
   means for adjusting the variable threshold priority level in dependence upon whether a size of the message queue is within a predetermined range to obtain an adjusted variable threshold priority level, discarding the messages in the message queue having a priority less than the adjusted variable threshold priority level;
   means for analyzing each predetermined type of message from the message queue;
   wherein the analyzing means comprises:
   means for registering which of a plurality of analyzer modules that form the analyzing means process which predetermined types of messages; and
   means for dispatching a next message from the message queue to each analyzer module registered to process the predetermined type of the next message; and
   wherein the analyzing means comprises means for informing respective ones of the analyzer modules of changes in whether messages of the predetermined types registered for processing by the respective analyzer modules are currently being added to the message queue by the adding means if the elapsed time exceeds a predetermined hysteresis time.

7. The apparatus as recited in claim 6 wherein the adjusting means comprises:
   means for increasing the variable threshold priority level to a higher level dependent upon whether a size of the message queue exceeds a predetermined maximum size;
   means for discarding the messages in the message queue having a priority less than the adjusted variable threshold priority level; and
   means for reducing the variable threshold priority level to a lower level as the adjusted variable threshold priority level dependent upon whether the size of the message queue is less than a predetermined minimum size.

8. The apparatus as recited in claim 7 wherein the adjusting means comprises means for determining an elapsed time since the variable threshold priority level was last changed so that the variable threshold priority level is reduced by the reducing means if the size of the message queue is less than the predetermined minimum size and the elapsed time exceeds a predetermined hysteresis time.

9. The apparatus as recited in claim 6 further comprising means for outputting results from the analyzing means.

10. The apparatus as recited in claim 6 further comprising means for logging results of the analyzing means.

11. The method as recited in claim 1 wherein the analyzing step comprises the steps of:
identifying from the messages in the message queue a program association table having a list of packet identifiers of program map tables associated with each of a plurality of programs in the transport stream;
generating from the program association table a checklist having members representative of respective ones of the packet identifiers in the program map tables in the transport stream and the associated programs; and
analyzing the messages to detect the program map tables to determine whether for each member of the checklist there is a program map table packet identifier for the associated program.

12. The method as recited in claim 11 wherein the identifying step comprises the steps of:
detecting a version change in the program association table from a prior program association table; and
suspending analysis of the messages for a predetermined period of transport stream time around the program association table in which the version change is detected.

13. The method as recited in claim 11 wherein the identifying step comprises the steps of:
detecting a version change in the program map table from a prior program map table; and
suspending analysis of the messages for a predetermined period of transport stream time around the program map table in which the version change is detected.

14. A method of monitoring a transport stream of a compressed video signal comprising the steps of:
extracting an information element from the transport stream;
generating a message of a predetermined type dependent on the extracted information element;
assigning a priority to the message, the priority being dependent on a predetermined criticality of the predetermined type to the integrity of the compressed video signal;
adding the message to a message queue if the priority of the message exceeds a variable threshold priority level;
adjusting the variable threshold priority level in dependence upon whether a size of the message queue is within a predetermined range to obtain an adjusted variable threshold priority level, discarding messages in the message queue having a priority less than the adjusted variable threshold priority level; and
analyzing a next message from the message queue according to the predetermined type of the next message;
wherein the analyzing step comprises the steps of:
identifying from the messages in the message queue a program association table having a transport stream identifier and a plurality of program numbers with each of the programs numbers being associated with one of a respective program in the transport stream;
generating from the program association table a checklist of members representative of the respective program numbers;
analyzing the messages to detect a service description table having a transport identifier and a second plurality of program numbers and associated program descriptions; and
determining whether for each member of the transport stream for the transport stream identifier corresponding to the service description table there is a program number and program description in the service description table; and
wherein the identifying step comprises the steps of:
detecting a version change in the program association table from a previous program association table; and
suspending analysis of the transport stream for a first predetermined period of transport stream time around the program association table in which the version change is detected.

15. The method as recited in claim 14 wherein the analyzing step comprises the steps of:
detecting a version change in the service description table from a previous service description table; and
suspending analysis of the transport stream for a second predetermined period of transport stream time around the service description table in which the version change is detected.

16. A method of monitoring a transport stream of a compressed video signal comprising the steps of:
extracting an information element from the transport stream;
generating a message of a predetermined type dependent on the extracted information element;
assigning a priority to the message, the priority being dependent on a predetermined criticality of the predetermined type to the integrity of the compressed video signal;
adding the message to a message queue if the priority of the message exceeds a variable threshold priority level;
adjusting the variable threshold priority level in dependence upon whether a size of the message queue is within a predetermined range to obtain an adjusted variable threshold priority level, discarding messages in the message queue having a priority less than the adjusted variable threshold priority level; and
analyzing a next message from the message queue according to the predetermined type of the next message;
wherein the analyzing step comprises the steps of:
identifying from the messages in the message queue a program association table having a transport stream identifier and a plurality of program numbers with each of the programs numbers being associated with one of a respective program in the transport stream;
generating from the program association table a checklist of members representative of the respective program numbers;
analyzing the messages to detect a service description table having a transport identifier and a second plurality of program numbers and associated program descriptions; and
determining whether for each member of the transport stream for the transport stream identifier corresponding to the service description table there is a program number and program description in the service description table; and
wherein the analyzing step comprises the steps of:
detecting a virtual channel table in the service description table; and
determining whether for each member of the checklist for the transport stream identifier of the virtual channel table there is a program number and program description in the virtual channel table.

17. The method as recited in claim 1 wherein the analyzing step comprises the steps of:
identifying from the messages in the message queue a master guide table having a transport stream identifier and a list of event information tables of programs transmitted in the transport stream in consecutive periods of time;

analyzing the master guide table to determine the presence or absence of a terrestrial transport stream identifier and, if present, the presence or absence of a predetermined number of event information tables including a current event information table of programs currently being transmitted; and outputting signals representative of results of the analysis to the user interface.

\* \* \* \* \*